3,242,164
CERTAIN BENZAZEPINE COMPOUNDS AND THEIR PREPARATION

Margaret H. Sherlock, Bloomfield, N.J., assignor to Schering Corporation, Bloomfield, N.J., a corporation of New Jersey
No Drawing. Filed Mar. 16, 1964, Ser. No. 352,303
11 Claims. (Cl. 260—239)

This invention relates to compositions of matter classified in the art of chemistry as being derivatives of 5-phenyl-tetrahydro-2-benzazepines and to processes for making and using such compositions.

The invention sought to be patented in its composition aspect is described as residing in the concept of a chemical compound having the molecular structure of a 2,3,4,5-tetrahydro-1H-2-benzazepine having at the 5-position both a phenyl substituent and a carbalkoxy substituent and at the 2-position a hydrogen, lower alkyl, lower alkenyl, or an isocyclic-lower alkyl having 3–6 cyclic carbon atoms. Included within this concept are the pharmaceutically acceptable acid addition and quaternary salts thereof.

The invention sought to be patented in its process aspect is described as residing in those concepts which comprise heating a 2-R-substituted-5-phenyl-2,3,4,5-tetrahydro-1H-2-benzazepine with butyl lithium wherein R is a member of the group consisting of hydrogen, lower alkyl, lower alkenyl, and isocycliclower alkyl having 3–6 cyclic carbon atoms and subsequently reacting the resulting lithio-derivative with carbon dioxide which results in the formation of 5-phenyl-5-carboxy-2-R-substituted-2,3,4,5-tetrahydro-1H-2-benzazepine, which carboxylic acid compound is esterified with a monoatomic aliphatic alcohol having 1–6 carbon atoms.

The tangible embodiments of the invention in the form of the free base or acid addition and quaternary salt thereof possess the inherent applied use characteristic of exerting the pharmacological profile of a narcotic-type analgesic with significant analgesic activity and, as such, are therapeutically useful.

The tangible embodiments of this invention are chemical compounds having the structural formula:

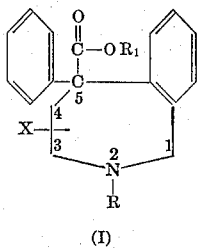

(I)

wherein R is a member of the group consisting of H, lower alkyl, lower alkenyl, and isocyclic-lower alkyl having 3–6 cyclic carbon atoms, $R_1$ is lower alkyl and X is a member of the group consisting of hydrogen and lower alkyl. Included within the foregoing are the acid addition salts and quaternary salts of the bases depicted. The system of numbering the nuclear atoms is set forth in the formula.

The substituent "R" includes such monovalent radicals as ethyl, propyl, butyl, but preferably methyl when representative of lower alkyl; butenyl, pentenyl but preferably propenyl when representative of lower alkenyl; cyclopropylethyl, phenylmethyl, p-aminophenylmethyl but preferably cyclopropylmethyl, cyclopropylethyl and p-aminophenylethyl when representative of isocyclic-lower alkyl having 3–6 cyclic carbon atoms. When the substituents designated as "X" and "R," are representative of lower alkyl the preferred radicals are methyl and ethyl.

The 5-phenyl-2-methyl-2,1-benzazepine intermediate useful in the preparation of the tangible embodiments of this invention (I) are prepared by heating an o-dimethyl-aminomethyldiphenyl-methane or an o-dibenzylamino-methyldiphenylmethane or an o-N-benzyl-N-methylamino-methyldiphenylmethane, the methane carbon atom of which bears a lower alkyl group having at least two carbon atoms, the β-carbon atom of said alkyl group bearing a substituent such as dimethylamino, dibenzylamino, halogen (preferably chloro or bromo), tosyloxy and mesyloxy. Upon heating such a material at substantially elevated temperature, ring closure occurs resulting in a compound having the structural formula:

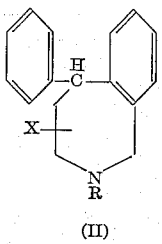

(II)

where the aforementioned substituent is an amino function as described heretofore, the cyclized product is a tertiary amine of Formula II. Where the substituent is halogen, the product formed is a quaternary salt which may be dealkylhalogenated to form the tertiary amine.

It will be apparent to one skilled in the art that precursors of the aforementioned starting materials, such as those possessing a hydroxy or lower alkoxy (preferably methoxy or ethoxy) group in the β-position of the aforementioned alkyl group, may be used by reacting said oxy compounds with a reagent which replaces the oxy function by halogen and then heating the halogenated product. For example, where the substituent is ethoxy, such a compound is heated with a hydrohalic acid, preferably hydrobromic acid, whereby the ethoxy group is replaced by bromo. Indeed, the o-$R_1R_2$-aminomethyl group simultaneously may form a hydrobromic salt. This intermediate is preferably not isolated but is heated in situ in the presence of hydrobromic acid resulting in in situ ring closure forming a benzazepinium quaternary bromide. This method is outlined in further detail in subsequent passages. On the other hand, where the substituent is hydroxy, such a compound is reacted with thionyl chloride, for example, and heated in situ. The reaction with thionyl chloride effects replacement of the hydroxy by chloro with probable simultaneous formation of the hydrochloride of the o-$R_1R_2$-aminomethyl group. Upon heating in situ, ring closure occurs with the formation of a benzazepinium quaternary chloride. This reaction also is set forth in more detail in subsequent passages. The starting materials in this process aspect are formed in situ and acted upon in situ are full equivalents of my invention in its process aspect.

A preferred method for preparing the compounds represented by Formula II, wherein R is methyl consists of alkylating o-dimethylaminomethyldiphenylmethane III with β-bromoethyl ethyl ether in the presence of a basic condensing agent such as sodamide in liquid ammonia. The β-ethoxyethyl analog (IV) formed thereby is heated with a strong acid, preferably concentrated hydrobromic acid, whereby the benzazepinium bromide V is formed. Heating the quaternary salt eliminates the element of methyl bromide resulting in the formation of tertiary amine VI. The quaternary salt may alternatively be demethobrominated by reaction with lithium aluminum hydride or an alkali metal borohydride. This reaction sequence is depicted as follows:

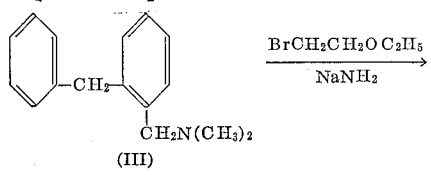
(III)

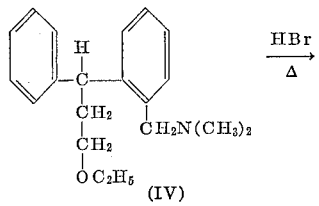
(IV)

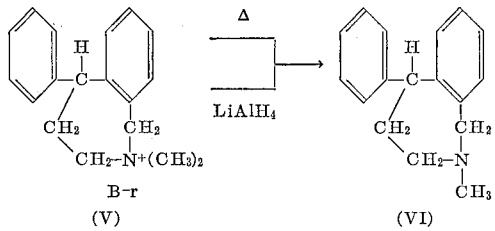
(V)            (VI)

In place of the bromoethyl ether, there may be employed an alkylating agent such as dimethylaminoethyl chloride. The diamine, VII, thus formed is then transformed into its monohydrochloride salt and heated whereby cyclization occurs. The free base VIII is obtained by rendering the cyclized residue alkaline and extracting wth an organic solvent such as ether. This reaction sequence is shown as follows:

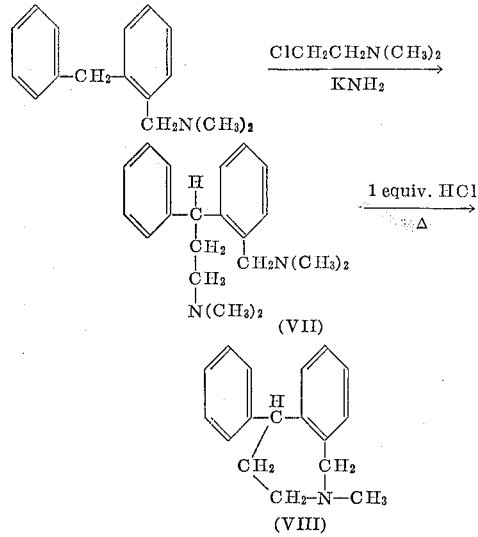
(VII)

(VIII)

It is apparent that the dimethylaminoethyl chloride may carry an alkyl substituent such as methyl or ethyl in either one of its carbon atoms, for example, 2-dimethylaminopropyl chloride. Two products are accordingly formed with this reagent: One having the alkyl substituent in the 2-position and the other in the 3-position.

A further method for arriving at the compounds of Formula II wherein R is hydrogen is that depicted by the following reaction scheme:

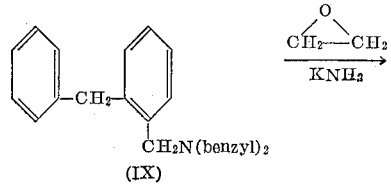
(IX)

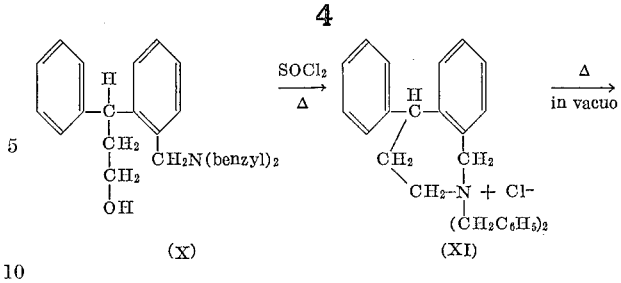
(X)            (XI)

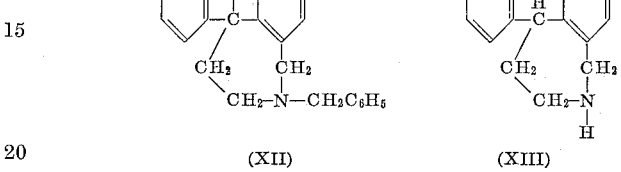
(XII)            (XIII)

In this sequence, o-dibenzylaminodiphenylmethane (IX) is alkylated with ethylene oxide to produce the hydroxy intermediate (X). Replacement of the hydroxy group by chlorine is effected by thionyl chloride and heating results in the formation of the quaternary benzyl chloride (XI). (An intermediary "chlorohydrochloride" which is the starting material for the process aspect of my invention is formed and acted upon in situ.) Elimination of benzyl chloride yielding XI is accomplished by heating the dry quaternary salt in vacuo and debenzylation effected by reduction with hydrogen on a palladium charcoal catalyst. There is thus obtained the secondary amine XIII. The nitrogen atom of XIII may now be alkylated, if desired, by known means to yield the tertiary amine, i.e. R=lower alkyl or phenyl lover alkyl.

It will be apparent to one skilled in the art that by utilizing, 1,2-propylene oxide in place of ethylene oxide analogous reactions take place with the methyl group appearing as a substituent on the heterocyclic ring, most probably in the 3-position. This accordingly is a means for preparing such an analogous product.

The quaternary ammonium salts are prepared in the known manner by reacting the tertiary amine of formula I with a quaternizing agent such as a lower alkyl halide or sulfate. An alternative method is that wherein an o-dimethylaminoethyldiphenyl methane (III) is alkylated with an ethylene oxide as described heretofore and the hydroxy compound (XIV) treated with thionyl chloride. The chloro compound (XV) formed thereby upon heating is cyclized to yield the methyl quaternary salt (XVI).

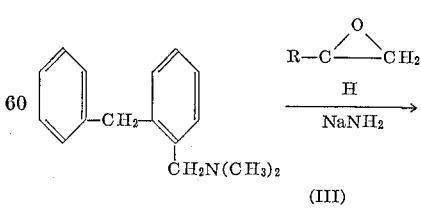
(III)

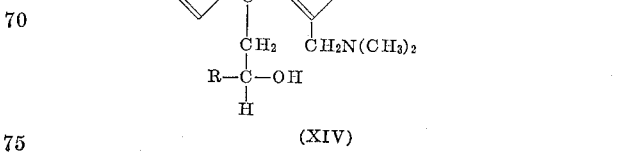
(XIV)

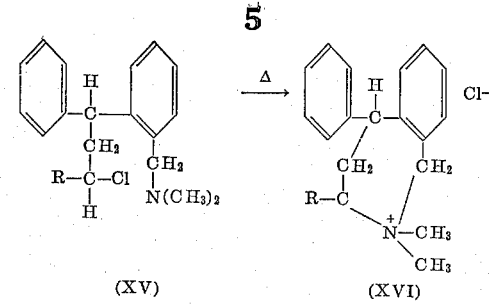

(XV)    (XVI)

In the foregoing R represents H or methyl. It is necessary to treat the product of the reaction of XIV with thionyl chloride with alkali in order to prepare the free base XV.

In the reaction schemes illustrated heretofore, the starting materials shown are either o-dimethylamino-methyldiphenyl methanes or o-dibenzylaminomethyldiphenyl methanes. A "mixed" alkylamino compound such as o-N-methyl-N-benzylaminomethyldiphenyl methane may also be utilized. Under these circumstances, the benzyl group is the more labile and is eliminated upon ring closure or by catalytic hydrogenation.

It will be apparent to one skilled in the art that the aminomethyldiphenylmethanes may carry one or more common substituents in either one or both of the phenyl rings. Such common substituents are halogen (preferably chloro), lower alkoxy (preferably methoxy), lower alkyl (preferably methyl), hydroxy, lower alkanoyloxy, and obvious equivalent thereof. These substituents do not materially alter the biological properties of the unsubstituted compound making for differences in degree rather than kind. I therefore consider such ring substituted compounds as the full equivalent of the corresponding unsubstituted compounds of Formula I and within the concept of the composition aspect as set forth therein.

The precursors for the starting materials of the process aspect of my invention, i.e., the o-disubstituted amino-methyldiphenylmethanes are prepared from the reaction of an appropriately substituted o-benzylbenzoic acid (XVII) and dimethylamine (or dibenzylamine or methyl-benzylamine). Heating these two reagents together at temperatures above 100° C. permits the reaction to proceed with concomitant removal of water and results in the formation of an intermediate amide (XVIII) which is reduced with lithium aluminum hydride, for example, to yield the requisite o-disubstituted aminomethyldiphneyl-methane (XIX). This sequence of reactions is illustrated as follows:

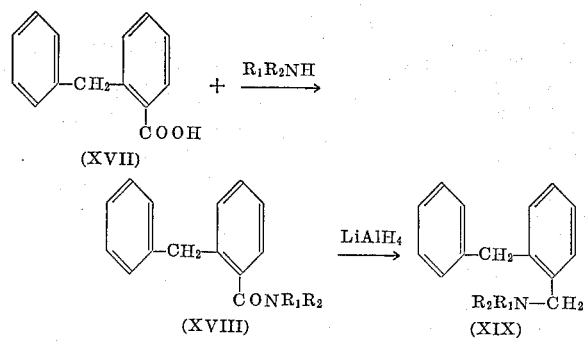

In this reaction $R_1$ and $R_2$ represent methyl or benzyl. It is apparent that conversion of the benzylbenzoic acid (XVII) to its acid chloride followed by treatment with the secondary amine represents an alternate and obviously equivalent method for preparing XVIII. The benzyl-benzoic acids (XVII) are prepared by methods fully described in the art which includes those benzylbenzoic acids having nuclear substituents as set forth above. Thus in order to prepare a tangible embodiment of this invention as represented by Formula I but including a substituent on one or both of the aromatic rings, the correspondingly substituted benzylbenzoic acid is utilized.

In general, the compounds of Formula I (except when R represents hydrogen) may readily be prepared by direct alkylation of a benzazepine according to the following reaction scheme:

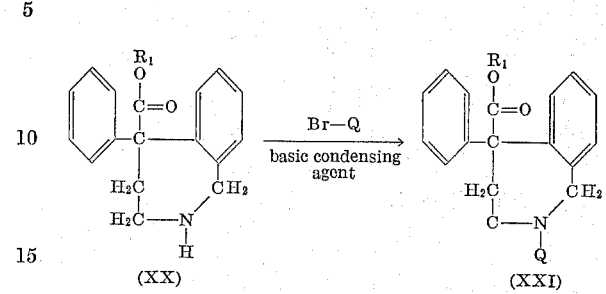

(XX)    (XXI)

wherein Q represents lower alkyl, lower alkenyl, and iso-cyclic-lower alkyl having 3-6 carbon atoms and $R_1$ is as defined in Formula I.

The foregoing reaction constitutes the condensation of an organic halide (preferably bromide or chloride) wherein the reaction is effected in an inert solvent such as benzene preferably at reflux temperature and in the presence of a condensing agent such as sodium bicarbonate. Exemplary of the halides used are allyl bromide, phenethyl-bromide and the like. The reaction product is obtained by neutralization with mineral acid, followed by treatment with aqueous alkali and extraction with a water immiscible solvent.

The foregoing 5-carbalkoxy-5-phenyl-benzazepine intermediates (XX) may readily be prepared from a tertiary amine such as 2-benzyl-5-phenyl-2,3,4,5-tetrahydro-1H,2-benzazepine (XII) whereby said compound is first carboxylated and the resulting 5-carboxy compound is subsequently esterified by techniques well known in the art. The 5-phenyl-5-carboxy benzazepines are prepared by reacting compound XII with an organometallic reactant, such as butyl lithium, and subsequently reacting the lithio derivative with carbon dioxide. The resulting carboxylic acid compounds are esterified by reaction with a monovalent aliphatic alcohol having 1-6 carbon atoms. Following the esterification reaction, the protective benzyl grouping is easily cleaved by catalytic hydrogenation to regenerate the corresponding amine (XX).

It is also quite obvious that an alternative procedure for preparing the compounds of this invention is available which will obviate the necessity of preparing a compound having the protective benzyl grouping. For example, in those instances wherein the 5-phenyl-2,3,4,5-tetrahydro-1H,2-benzazepine intermediates are compounds which do *not* possess a free amino radical, e.g., those instances wherein the 2-position substituent is hydrogen or amino-phenylethyl or the like, the 5-position carbon atom may be carboxylated and esterified without the necessity of protecting the amino moiety with a benzyl radical. Therefore, in those such instances, the 2-position substituents may be "affixed" to the benzazepine nucleus prior to the aforementioned carboxylation and esterification procedures.

The following examples are illustrative of the preparation of the tangible embodiments of this invention. This invention is not limited to such examples but only by the appended claims and the obvious equivalents thereof taught herein.

PREPARATION 1

*o-Benzyl-N,N-dimethylbenzamide*

Melt o-benzylbenzoic acid. Bubble dimethylamine through the melt for 2–3 hours. Cool, triturate the solids with ether and filter. Wash the ether with dilute hydrochloric acid, then with water and then with 10% sodium carbonate solution. Dry the ether over sodium sulfate and evaporate to a residue consisting of the middle of this example.

PREPARATION 2 o-Benzyl-N,N-dibenzylbenzamide

To a solution of o-benzylbenzoyl chloride in anhydrous benzene, add dropwise a solution of dibenzylamine in anhydrous benzene (slight excess of dibenzylamine). Stir for one hour. Extract the reaction mixture with 10% sodium carbonate solution then with water and then with dilute hydrochloric acid. Dry and evaporate to a residue consisting of the amide of this example.

PREPARATION 3 o-Dimethylaminomethyldiphenylmethane

Suspend 16 gm. of lithium aluminum hydride in 500 ml. of anhydrous ether and add dropwise, a solution of 38 gm. of o-benzyl-N,N-dimethylbenzamide (from Preparation 1) in 100 ml. of ether. Reflux for six hours, cool and pour into a cold 15% sodium hydroxide solution. Separate the ether layer and wash the aluminum salts with ether. Dry the ether solution and evaporate to a residue. Distill in vacuo obtaining the compound of this example, 36 gm., B.P. 109–112 (0.5 mm.).

In similar fashion, by utilizing the compound of Preparation 2 in the above procedure, there is obtained o-dibenzylaminomethyldiphenylmethane.

Nuclear substituted analogs of the compound of this example are prepared from the correspondingly substituted benzylbenzoic acids such as, for example, o-(p-chlorobenzyl)-benzoic acid which as per Preparations 1 and 3 give rise to o-dimethylaminomethyl-p'-chlorodiphenylmethane.

EXAMPLE 1

2-methyl-5-phenyl-2,3,4,5-tetrahydro-1H-2-benzazepine

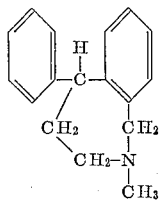

While stirring a solution of potassium amide (prepared from 4.0 gm. of potassium in 400 ml. of liquid ammonia) add 22.5 gm. of o-dimethylaminomethyldiphenyl methane (from Preparation 3). Stir for 30 minutes and then add 13.5 gm. of β-dimethylaminoethyl chloride. Allow the ammonia to evaporate. Add water and extract the mixture with ether. Dry the ether solution, concentrate and distill the residue in vacuo obtaining α-(β-dimethylaminoethyl) - o - dimethylaminomethyldiphenyl methane, B.P. 142–147° C./0.5–1.0 mm.

Dissolve 3.3 gm. of the product obtained above in 5.4 ml. of water containing 1.95 gm. of concentrated hydrochloric acid. Evaporate the solution to dryness and heat the mono-hydrochloride at 270–290° C. until the evolution of gas (trimethylamine) ceases. Dissolve the residue in dilute hydrochloric acid, make alkaline with 10% aqueous sodium carbonate solution and extract with ether. Dry the ether solution and concentrate to a residue. Crystallize from petroleum ether obtaining the compound of this example, M.P. 74–75° C.

An alternate procedure for preparing the benzazepine of this example is as follows:

Suspend sodamide (from 2.5 gm. of sodium) in 400 ml. of liquid ammonia and add 22.5 gm. of o-dimethylaminomethyldiphenyl methane. Stir for 30 minutes and then add 18.5 gm. of β-bromoethyl ether. Allow the ammonia to evaporate and then add 500 ml. of water. Extract with ether, dry the extracts, concentrate and distil in vacuo obtaining α-(β-ethoxyethyl)-o-dimethylaminomethyldiphenyl methane, B.P. 145–149° C./1 mm.

Dissolve 21.9 gm. of the product obtained upon distillation in 125 ml. of 48% hydrobromic acid and reflux for 22–24 hours. Concentrate in vacuo to a residue and crystallize from ethanol-ether obtaining 5-phenyl-2,2-dimethyl - 2,3,4,5 - tetrahydro - 1H - 2 - benzazepinium bromide, M.P. 250–253° C.

Pyrolyze the quaternary salt by heating at 300–350° C. under vacuum (1–5 mm.) until no more distillate is formed. The distillate (B.P. 185–230° C./1–5 mm.) is crystallized from petroleum ether, M.P. 74–75° C. to yield the compound of this example.

EXAMPLE 2

5-phenyl-2,2,3-trimethyl-2,3,4,5-tetrahydro-1H-2 benzazepinium chloride

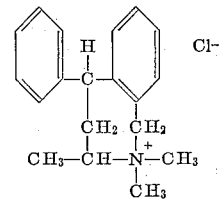

Suspend sodamide (from 3.72 gm. of sodium) in 200 ml. of liquid ammonia and add 31.7 gm. of o-dimethylaminomethyldiphenyl methane (Preparation 3). Stir the red solution for 30 minutes and then add 17.1 gm. of propylene oxide. Stir and allow the ammonia to evaporate. Add ice water and extract the mixture with ether. Dry the ether solution and distil collecting that fraction boiling at 166–167° (1.6 mm.) which consists of α-(2-hydroxypropyl) - o - dimethylaminomethyldiphenyl methane. Upon recrystallization from petroleum ether this substance melts at 91.5–92.5° C.

Dissolve 11.5 gm. of the hydroxypropyl intermediate prepared above in 100 ml. of anhydrous benzene. Cool and slowly add 6 gm. of thionyl chloride. Reflux for 30 minutes and concentrate to dryness in vacuo. Crystallize the residue from ethanol-ether to obtain α-(2-chloropropyl)-o-dimethylaminomethyldiphenyl methane hydrochloride, M.P. 155–156° C.

Treat the hydrochloride with aqueous sodium hydroxide and extract with ether. Dry the ether solution and concentrate to a residue. Heat the residue at 180–190° C. for 10 minutes and crystallize from ethanol-ether obtaining the quaternary chloride of this example, M.P. 246–249° C.

EXAMPLE 3

α-(β-Ethoxyethyl)-o-dibenzylaminomethyldiphenyl methane

The compound of this example is prepared via the first step in the alternate procedure of Example 1 utilizing potassium amide (from 2 gm. of potassium), 250 ml. of liquid ammonia, 18.8 gm. of o-dibenzylaminomethyldiphenyl methane and 7.7 gm. of β-bromo-ethyl ether.

EXAMPLE 4

5-phenyl-2,2-dibenzyl-2,3,4,5-tetrahydro-1H-2-benzazepinium bromide

Dissolve 12.5 gm. of the compound of Example 3 in 100 ml. of 48% hydrobromic acid and reflux for 20–24 hours. Concentrate to a residue in vacuo and crystallize from ethanol-ether to obtain the quaternary salt of this example.

EXAMPLE 5

5-phenyl-2-benzyl-2,3,4,5-tetrahydro-1H-2-benzazepine

Pyrolize the quaternary salt of Example 4 at 300–320° C. collecting that distillate boiling at 195–225° C./2.5 mm. The distillate cools to a glassy solid consisting of the compound of this example.

EXAMPLE 6

*5-phenyl-2,3,4,5-tetrahydro-1H-2-benzazepine*

Hydrogenate 3.5 gm. of the compound of Example 5 in 100 ml. of methanol in which is suspended 3.5 gm. of palladium charcoal catalyst (5%) by shaking in a Parr hydrogenator under 60 lbs. per sq. in. of hydrogen until the calculated theoretical quantity of hydrogen (1 mole per mole of 5-phenyl-2-benzyl-2,3,4,5-tetrahydro-1H-benzazepine) has been absorbed. Remove the catalyst by filtration and concentrate to a residue consisting of the secondary amine of this example. The benzazepine so formed is converted to its hydrochloride salt in ethanol with ethanolic hydrogen chloride and is recrystallized from ethanol to yield 5-phenyl-2,3,4,5-tetrahydro-1H-2-benzazepine hydrochloride, M.P. 201–202° C.

EXAMPLE 7

*5-phenyl-2-phenethyl-2,3,4,5-tetrahydro-1H-2-benzazepine*

To a stirred mixture of 4.5 gm. of the compound of Example 6, 100 ml. of anhydrous benzene and 2.0 gm. of anhydrous sodium bicarbonate, add 4.0 gm. of 2-phenethylbromide. Reflux and stir for 16–24 hours and add water. Separate the benzene layer, dry and concentrate in vacuo. The residue is an oil which slowly crystallizes yielding the compound of this example.

EXAMPLE 8

*5-phenyl-2,3-dimethyl-2,3,4,5-tetrahydro-1H-2-benzazepine*

Pyrolize the quaternary salt of Example 2 at 300–320° C. collecting that distillate boiling at 190–206° C./4–7 mm. Upon cooling, the distillate forms a glassy solid consisting of the compounds of this example. A maleate salt prepared from the base and maleic acid in a known manner melts at 119–121° C.

EXAMPLE 9

*5-phenyl-2-cyclopropylmethyl-2,3,4,5-tetrahydro-1H-2-benzazepine*

To a cooled (5° C.) solution containing 4.5 gm. of 5-phenyl-2,3,4,5-tetrahydro-1H-2-benzazepine, 2 gm. of pyridine and 150 ml. anhydrous ether, add 2.2 gm. of cyclopropylcarboxylic acid chloride and allow the reaction mixture to stir at room temperature overnight. Add water to decompose the reaction mixture; separate, dry and concentrate the ether layer to dryness.

Dissolve the resulting residue in 50 ml. of anhydrous ether, add the solution to a stirred solution containing 2 gm. of lithium aluminium hydride in 200 ml. of ether and reflux the mixture for three hours. Decompose and filter the refluxed mixture; separate and concentrate the ether layer to obtain 5-phenyl-2-cyclopropylmethyl-2,3,4,5-tetrahydro-1H-2-benzazepine.

EXAMPLE 10

*5-phenyl-2-allyl-2,3,4,5-tetrahydro-1H-2-benzazepine*

To a stirred mixture containing 4.5 gm. of 5-phenyl-2,3,4,5-tetrahydro-1H-2-benzazepine, 100 ml. of anhydrous benzene and 2.3 gm. of anhydrous sodium carbonate, add 2.6 gm. of allyl bromide. Reflux the resulting mixture for six hours and decompose and filter the reaction mixture. Separate and concentrate the benzene layer to obtain 5-phenyl-2-allyl-2,3,4,5-tetrahydro-1H-2-benzazepine.

EXAMPLE 11

*5-phenyl-2-(β-p-aminophenylethyl)-2,3,4,5-tetrahydro-1H-2-benzazepine*

To a cooled (5° C.) solution containing 6.7 gm. of 5-phenyl-2,3,4,5-tetrahydro-1H-2-benzazepine, 3 gm. of pyridine and 200 ml. of anhydrous ether, add 6.1 gm. of p-nitrophenylacetyl chloride in 50 ml. of ether and stir the resulting mixture at room temperature for 20 hours. Decompose and filter the reaction mixture; separate, dry and evaporate the ether layer to dryness. Add the residue to a stirred solution of 5 gm. of lithium aluminium hydride in 150 ml. of anhydrous tetrahydrofuran and reflux the reaction mixture for four hours. Decompose and filter the mixture; separate and concentrate the tetrahydrofuran layer to obtain 5-phenyl-2-(β-p-aminophenylethyl)-2,3,4,5-tetrahydro-1H-2-benzazepine.

EXAMPLE 12

*2-methyl-5-phenyl-5-carboxy-2,3,4,5-tetrahydro-1H-2-benzazepine*

To a solution of n-butyl lithium (prepared from 0.68 gm. of lithium shot and 6.8 gm. of n-butyl bromide) in 100 ml. of anhydrous ether add 10 gm. of 2-methyl-5-phenyl-2,3,4,5-tetrahydro-1H-2-benzazepine and reflux the solution for 2½ hours. Treat the reaction mixture with powdered carbon dioxide until all color has been discharged, decompose the reaction mixture with water and filter the precipitated solids. Concentrate, in vacuo, the aqueous portion of the foregoing filtrate to yield additional product. Recrystallize the solid material from ethanol to yield 2-methyl-5-phenyl-5-carboxy-2,3,4,5-tetrahydro-1H-2-benzazepine, M.P. 227–228° (dec.).

By substituting the 2-methyl-5-phenyl-2,3,4,5-tetrahydro-1H-2-benzazepine of the above example with 5-phenyl-2-benzyl-2,3,4,5-tetrahydro-1H-2-benzazepine,
1,2-dimethyl-5-phenyl-2,3,4,5-tetrahydro-1H-2-benzazepine,
5-phenyl-2-phenethyl-2,3,4,5-tetrahydro-1H-2-benzazepine,
5-phenyl-2,3-dimethyl-2,3,4,5-tetrahydro-1H-2-benzazepine,
5-phenyl-2-cyclopropylmethyl-2,3,4,5-tetrahydro-1H-2-benzazepine, and
5-phenyl-2-allyl-2,3,4,5-tetrahydro-1H-2-benzazepine and by following the teachings set forth in this example, there is produced 5-phenyl-5-carboxy-2-benzyl-2,3,4,5-tetrahydro-1H-2-benzazepine,
1,2-dimethyl-5-phenyl-5-carboxy-2,3,4,5-tetrahydro-1H-2-benzazepine,
5-phenyl-5-carboxy-2-phenethyl-2,3,4,5-tetrahydro-1H-2-benzazepine,
5-phenyl-5-carboxy-2,3-dimethyl-2,3,4,5-tetrahydro-1H-2-benzazepine,
5-phenyl-5-carboxy-2-cyclopropylmethyl-2,3,4,5 tetrahydro-1H-2-benzazepine, and
5-phenyl-5-carboxy-2-allyl-2,3,4,5-tetrahydro-1H-2-benzazepine.

EXAMPLE 13

*2-methyl-5-carbethoxy-5-phenyl-2,3,4,5-tetrahydro-1H-2-benzazepine*

Saturate a solution of 4 gm. of 2-methyl-5-carboxy-5-phenyl-2,3,4,5-tetrahydro-1H-2-benzazepine in 75 ml. of absolute ethanol with hydrogen chloride gas for two hours and reflux the resulting solution for 12 hours. Concentrate the refluxed solution and dissolve the residue in water. Basify the aqueous solution and extract such solution with ether. Dry the ethereal extracts, evaporate off the ether, and distil the residue to obtain 5-carbethoxy-5-phenyl-2-methyl-2,1-benzazepine; B.P. 180–183°/1.3 mm., $n_d^{20}$ 1.5756.

The hydrochloride salt is prepared in ethanol with ethanolic hydrogen chloride and is recrystallized from ethanol-ether as the monohydrated hydrochloride, M.P. 110–112°.

In a similar manner the 5-carboxy-5-phenyl-2-methyl-2,1-benzazepine may be esterified with other alcohols to produce the ester derivatives embraced by Formula I above. Similarly, the 5-carboxy-5-phenyl-2,3,4,5-tetrahydro-1H-2-benzazepines listed immediately below Example 12 may be esterified to form those 5-phenyl-5-carbalkoxy-2,3,4,5-tetrahydro - 1H-2 - benzazepines embraced by Formula I.

EXAMPLE 14

*1,2-dimethyl-5-phenyl-2,3,4,5-tetrahydro-1H-2-benzazepine*

To a solution consisting of potassium amide (0.125 mg.) in 500 ml. liquid ammonia, add 34 gm. of 2-benzylacetophenone diethylacetal. After 30 minutes add 15.8 gm. of β-N,N-dimethylaminoethyl chloride, and stir the resulting mixture for 16 hours. Decompose the reaction with water, extract with ether, combine and concentrate the ether extracts to obtain a residual oil. Hydrolyze the residual oil with 400 ml. of dilute hydrochloric acid on a steam bath for one hour and extract with ether. Basify and extract the aqueous layer with ether. Combine, dry and concentrate the ether extracts to yield o-(α(β-dimethylaminoethyl)benzyl) - acetophenone, B.P. 160–162°/0.7 mm.

To a solution of 29.2 gm. of the above ketone in 190 ml. methanol, add 6 gm. of sodium borohydride over a 45 minute period and stir the mixture for 16 hours. Concentrate the resulting mixture, in vacuo, add water and extract with ether. Concentrate the ether extracts to yield o-(α(β - dimethylaminoethyl)benzyl)-α-phenylethyl alcohol, M.P. 115°.

To a cooled solution of 10.6 gm. of the above alcohol in 75 ml. of C.P. benzene add 6 gm. of thionyl chloride and reflux the resulting mixture for three hours. Dilute the clear solution with ether to precipitate a semi-solid material. Decant the liquid from the semi-solid material, dissolve the residue in water, cool and basify the resulting solution. Extract the crude chloride with ether, dry and concentrate the ether extracts to dryness. Heat the crude chloride residue to obtain 1,2-dimethyl-5-phenyl-2,3,4,5-tetrahydro-1H-2-benzazepinium chloride.

Pyrolize the quaternary in vacuo in the usual manner to yield 1,2-dimethyl-5-phenyl-2,3,4,5-tetrahydro-1H-2-benzazepine. The maleate salt of this compound melts at 147–148° after recrystallization from ethyl acetate.

It is to be understood that the invention is not to be limited to the exact details of operation or exact compounds which are specifically shown and described, as obvious modifications will be apparent to one skilled in the art.

I claim:

1. A compound of the group consisting of a benzazepine having the structural formula:

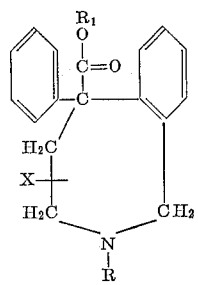

and the non-toxic acid addition salts and quaternary salts thereof wherein X is a member of the group consisting of hydrogen and lower alkyl, $R_1$ is lower alkyl and R is a member of the group consisting of hydrogen, lower alkyl, lower alkenyl, isocyclic-lower alkyl having 3–6 cyclic carbon atoms and p-aminophenyl-lower alkyl.

2. 2-methyl-5-phenyl-5-carbethoxy-2,3,4,5 - tetrahydro-1H-2-benzazepine.
3. 5-phenyl - 5 - carbethoxy - 2,3,4,5 - tetrahydro-1H-2-benzazepine.
4. 5-phenyl-5-carbethoxy - 2 - phenethyl - 2,3,4,5-tetrahydro-1H-2-benzazepine.
5. 5-phenyl-5-carbethoxy - 2,3 - dimethyl - 2,3,4,5-tetrahydro-1H-2-benzazepine.
6. 5-phenyl-5-carbethoxy-2-cyclopropylmethyl - 2,3,4,5-tetrahydro-1H-2-benzazepine.
7. 5-phenyl-5-carbethoxy - 2 - allyl - 2,3,4,5-tetrahydro-1H-2-benzazepine.
8. 5-phenyl - 5 - carbethoxy-2-(β-p-aminophenylethyl)-2,3,4,5-tetrahydro-1H-2-benzazepine.
9. 1,2-dimethyl-5-phenyl - 5 - carbethoxy - 2,3,4,5-tetrahydro-1H-2-benzazepine.
10. A member of the group consisting of a benzazepine having the following structural formula:

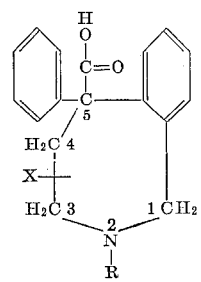

wherein X is a member of the group consisting of hydrogen and lower alkyl, and R is a member of the group consisting of hydrogen, lower alkyl, lower alkenyl, p-aminophenyl-lower alkyl, and isocyclic-lower alkyl having 3–6 cyclic carbon atoms.

11. In the process of preparing a 2-R-substituted 5-phenyl-5-carbo-lower alkoxy - 2,3,4,5 - tetrahydro - 1H-2-benzazepine wherein R is a member of the group consisting of hydrogen, lower alkyl, lower alkenyl, p-aminophenyl-lower alkyl, and isocyclic-lower alkyl having 3–6 cyclic carbon atoms, the steps which comprise heating a 2-R-substituted-5-phenyl - 2,3,4,5 - tetrahydro-1H-2-benzazepine with butyl lithium and subsequently reacting the resulting lithio-derivative with carbon dioxide, to form a 2-R-substituted-5-phenyl - 5 - carboxy - 2,3,4,5-tetrahydro-1H-2-benzazepine which is esterified with a lower alkanol having 1–6 carbon atoms.

References Cited by the Examiner

Wagner et al.: Synthetic Organic Chemistry (New York, 1953), pages 666–670.

NICHOLAS S. RIZZO, *Primary Examiner.*